United States Patent [19]

Barton et al.

[11] Patent Number: 4,965,332

[45] Date of Patent: Oct. 23, 1990

[54] SILYL- AND DISILANYL-1,3-BUTADIYNE POLYMERS FROM HEXACHLORO-1,3-BUTADIENE

[75] Inventors: Thomas J. Barton; Sina Ijadi-Maghsoodi, both of Ames, Iowa

[73] Assignee: Iowa State University Research Foundation, Inc., Ames, Iowa

[21] Appl. No.: 352,825

[22] Filed: May 16, 1989

[51] Int. Cl.$^5$ .............................................. C08G 77/04
[52] U.S. Cl. ........................................ 528/25; 528/33; 556/430; 556/468
[58] Field of Search .................. 556/430, 468; 528/25, 528/33

[56] References Cited

U.S. PATENT DOCUMENTS

| | | | |
|---|---|---|---|
| 3,660,449 | 5/1972 | Schaschel | 260/448.2 |
| 3,699,140 | 10/1972 | Chandra et al. | 260/448.2 |
| 3,700,714 | 10/1972 | Hamilton et al. | 260/448.2 |
| 3,714,118 | 1/1973 | Chandra et al. | 260/46.5 |
| 3,758,541 | 9/1973 | Chandra et al. | 260/448.2 |
| 4,260,780 | 4/1981 | West | 556/430 |
| 4,276,424 | 6/1981 | Peterson, Jr. et al. | 556/430 |
| 4,339,562 | 7/1982 | Guselnikov et al. | 528/14 |
| 4,618,666 | 10/1986 | Porte | 528/33 |
| 4,800,221 | 1/1989 | Marko | 528/10 |

*Primary Examiner*—Melvyn L. Marquis
*Attorney, Agent, or Firm*—Zarley McKee, Thomte, Voorhees & Sease

[57] ABSTRACT

Organosilane polymers having recurring silylene-1,3-butadiyne and/or disilylene-1,3-butadiyne units are prepared in a one-pot synthesis from hexachlorobutadiene. Depending on the organic substituents (R and R'), these polymers have useful film-forming properties, and are converted to the ceramic, silicon carbide upon heating a very uniform high char yields. They can also be pulled into fibers. The polymers are thermally crosslinked above 100° C.

23 Claims, No Drawings

SILYL- AND DISILANYL-1,3-BUTADIYNE POLYMERS FROM HEXACHLORO-1,3-BUTADIENE

GRANT REFERENCE

This invention was made with Government support under Contract No. W-7405-ENG-82 awarded by the Department of Energy. The Government has certain rights in the invention.

BACKGROUND OF THE INVENTION

The present invention relates to organosilicon polymers having recurring silylene-1,3-butadiyne units. In particular, the invention relates to reaction products of hexachloro-1,3-butadiene and n-butyllithium followed by quenching with certain dichlorosilanes to provide useful polymers that have good film-forming properties, at least one of which can be pulled into fibers, all of which are thermally converted into silicon carbide with a high ceramic yield, and many of which offer attractive candidates for electrical conduction and non-linear optical properties.

Moreover, it is unique to the present invention that the polymers are prepared in high yield, in a single-pot economical reaction, which uses convenient and ordinary temperature and pressure limits and ranges.

Accordingly, it is the primary objective of the present invention to prepare a series of silylene- and disilylene-1,3-butadiyne polymers that can be cast into films, that if they have a pendant aryl moiety fibers can be pulled from solution, that are polymers that can be thermally converted in high ceramic yield into silicon-carbide containing ceramics, and which provide polymers which are attractive candidates for electrical conduction and nonlinear optical properties.

The method and means of accomplishing this primary objective, as well as others, will become apparent from the detailed description of the invention which follows hereinafter.

SUMMARY OF THE INVENTION

This invention relates to silylene- and disilylene-1,3-butadiyne polymers. The polymers are prepared by reacting hexachloro-1,3-butadiene with n-butyllithium, followed by quenching with $RR'SiCl_2$ to produce silylene-1,3-butadiyne polymers or followed by quenching with $ClR_2SiSiR_2Cl$ to form disilylene-1,3-butadiyne polymers.

DETAILED DESCRIPTION OF THE INVENTION

This invention involves preparation of two different, but distinctly related, organosilicon polymers. The first has a recurring silylene-1,3-butadiyne unit, and the second has a recurring disilylene-1,3-butadiyne unit.

The first group of polymers have a recurring silylene-1,3-butadiyne unit of the formula:

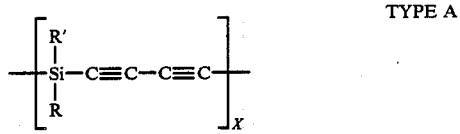

TYPE A wherein R and R' represent an organic moiety and "X" is an integer of from 20 to 500. These are hereinafter referred to, from time to time, as a "Type A" polymers.

The second group of polymers that are prepared in accordance with this invention have a recurring disilylene-1,3-butadiyne unit of the following formula:

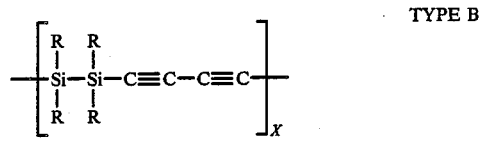

TYPE B wherein "X" is an integer of from 20 to 500 and R is an organic moiety. These are for brevity referred to from time to time hereinafter as "Type B" polymers.

Whether a Type A silylene- polymer is formed, or a Type B disilylene- polymer is formed depends upon the quenching reaction and whether or not it uses for the quench $RR'SiCl_2$ (Type A polymers) or $ClR_2SiSiR_2Cl$ (Type B polymers).

In the general formulas given for the recurring monomer units of both Type A and Type B as hereinbefore described, R can be any organic moiety, but is preferably selected from the group consisting of hydrogen, $C_1$ to $C_{20}$ alkyl, $C_6$ to $C_{20}$ aryl, and $C_7$ to $C_{20}$ alkylaryl. Preferably, R is selected from the group consisting of hydrogen and $C_1$ to $C_5$. Most preferably R is either hydrogen or methyl. Hydrogen and methyl are most preferred because these will provide the highest yield of silicon carbide upon heating.

The polymers of this invention, whether Type A polymers or Type B polymers, generally have a molecular weight within the range of about 2,000 to about 120,000. The average molecular weight on a weight average basis is generally around 20,000. The number of recurring units in the polymer will vary from as little as 20 up to 500, but preferably will have an average chain length within the range of from about 200 to about 300 recurring units. Further the details of the polymer, the polymer characterization and structure will be given in the examples and after a description of the process of the invention.

In the process of the invention, whether one is forming the silylene- polymers (Type A) or the disilylene-polymers (Type B) the first step of the reaction is the same. In this first step of the reaction, hexachloro-1,3-butadiene is reacted with n-butyllithium to yield dilithiobutadiyne. This may be represented by the following equation:

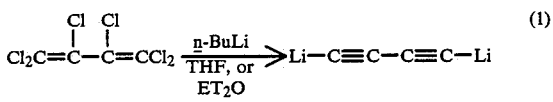

(1)

In this first step reaction, the amount of BuLi employed should be a stoichiometric amount, preferably the molar ratio of n-butyllithium to hexachloro-1,3-butadiene should be about 4:1. The important feature is that there needs to be a sufficient amount to replace all of the chlorine in the hexachloro-1,3-butadiene, thus the 4:1 ratio. Excess amounts can be employed, but the amount should be at least approximately a stoichiometric amount. If less than a stoichiometric amount is employed, there will be an insufficient amount to remove the chlorine atoms from the hexachloro-1,3-butadiene and early chain termination will result in lower molecular weights. On the other hand, if there are excess amounts, that is substantially in excess of the stoichiometry, it not only is expensive but too large amounts may be harmful as the excess n-butyllithium may react with the chlorosilane reagent.

The first step reaction is fast, and therefore not time dependent. It is also not temperature dependent.

The second step reaction of the process is carried on in the same pot and is referred to as a quenching reaction. It is represented by Equation 2 below.

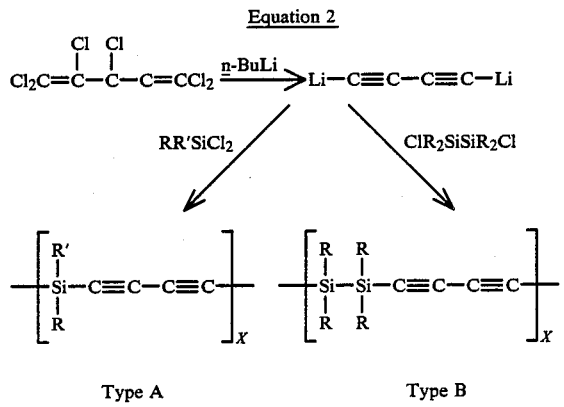

Equation 2

Type A  Type B

As can be seen, the reaction is virtually identical, whether one is forming a Type A polymer or a Type B polymer simply dependent upon whether it is quenched with $RR'SiCl_2$ or $ClR_2SiSiR_2Cl$.

This quenching reaction step, as well as the reaction with n-butyllithium is preferably conducted in the presence of an organic solvent. Preferred solvents are tetrahydrofuran, diethyl ether, benzene and hexane.

The initial reaction, that is the combination of the hexachloro-1,3-butadiene and the n-butyllithium can be conducted at room temperature or lower temperatures. However, since the reaction is exothermic it has been found convenient, although not essential, that the reaction be initiated at dry ice temperatures, $-78°$ C., with gradual addition of the hexachloro-1,3-butadiene to the n-butyllithium over a period of time, for example 5–20 minutes, with stirring. Then the dry ice bath can be removed and the mixture allowed to warm to room temperature. This same repetition of cooling followed by warming can be accomplished in the addition of the silylene or disilylene compound to form the Type A or Type B polymers. Generally speaking, the reaction may be run at any temperature between $-78°$ C. and room temperature. The reaction also does not appear to be time dependent since it goes fairly rapidly. Generally, the qualities of the polymers produced appears to be better when temperatures below room temperature are employed, followed by gradual warm up.

The R moiety of the polymers can be selected from hydrogen, $C_1$ to $C_{20}$ alkyl, $C_6$ to $C_{20}$ aryl and $C_7$ to $C_{20}$ alkylaryl. R and R may be the same or different. Where R is phenyl it has been found that they can be pulled into fiber forms from concentrated solutions.

All of these polymers are converted to the ceramic, silicon carbide, upon heating, and the ceramic yields are uniformly high. The ceramic char contains both silicon carbide and carbon. As earlier stated, some of the polymers (R=phenyl) can be pulled into fibers. All can be solvent cast into films.

In addition to their commercial potential as preceramic polymers, these materials have the potential of being doped electrical conductors and of possessing interesting nonlinear optical properties.

The following examples are offered to further illustrate, but not limit, the process of this invention and are offered to show characterization of the polymers.

EXAMPLES

All polymer yields are greater than 90%. Polymer characterization was by: (1) infrared (IR) which in all cases showed a C≡C stretching absorption; (2) carbon-13 nuclear magnetic resonance ($^{13}$C-NMR) which in all cases showed two acetylenic carbon resonances at ca. δ80-92; (3) proton nuclear magnetic resonance ($^1$H-NMR) which showed only the appropriate absorptions for the alkyl or aryl substituents; (4) combustion elemental analysis which was within accepted error limits for calculated carbon and hydrogen content; (5) ESCA (Electron Spectroscopy for Chemical Analysis) which found only carbon and silicon in the polymers; and (6) gel permeation chromatography (GPC) from which the molecular weights ($M_w$) were obtained relative to polystyrene standards.

EXAMPLE 1

The synthesis of $[Me_2Si-C≡C-C≡C]_n$ is given as a representative example:

To a dry, 500 mL, three-necked, round-bottomed flask (equipped with a water condenser, an overhead mechanical stirrer and an additional funnel and flushed with argon) was added 60 mL of freshly distilled benzene and 84 mL (0.21 mol) of 2.5 M n-BuLi in hexane followed by 60 mL of ethyl ether ($Et_2O$) (to flush the addition funnel). After cooling the solution to $-78°$ C., 7.83 mL (0.05 mol) of hexachlorobutadiene in 20 mL $Et_2O$ was added in a dropwise fashion over a period of 30–45 minutes. The resulting mixture was allowed to warm to room temperature and stirring was continued for three hours after which time the mixture was a light brown color and contained a considerable amount of precipitated lithium chloride (LiCl). This mixture was recooled to $-78°$ C. and 0.05 mol (6.06 mL) of dichlorodimethylsilane ($Me_2SiCl_2$) was added in a dropwise fashion over a 5 minute period. The resulting mixture was allowed to warm to room temperature over a five hour period. The mixture was washed three times with 100 mL of 0.5 N aqueous HCl, the organic layer dried over $Na_2SO_4$ and the solvent was removed in vacuo. The remaining solid was dissolved in 100 mL THF and then added dropwise with stirring to 300 mL MeOH to produce a light brown precipitate which was filtered and dried in vacuum (yield=94%). The polymer thus obtained was soluble in halogenated hydrocarbons (e.q., chloroform) and aromatics (e.g., benzene) but insoluble in alcohols and aliphatic hydrocarbons (e.g. hexane).

| Characterization of $-[Me_2Si-C≡C-C≡C]-_n$: | | |
|---|---|---|
| IR: | 2974 and 2874 cm$^{-1}$ (m) | $CH_3$ stretch |
|  | 2073 cm$^{-1}$ (vs) | C≡C stretch |
|  | 1256 cm$^{-1}$ (m) | Si—$CH_3$ |
|  | 812 cm$^{-1}$ (s) | Si—$CH_3$ |
| $^1$H—NMR (300 MHz): | δ 0.33 ($CH_3$) | |
| $^{13}$C—NMR: | δ —0.6 ($SiCH_3$) | |
|  | δ 82 (Si—C≡) | |
|  | δ 89 (≡C—C≡) | |

| Characterization of —[Me$_2$Si—C≡C—C≡C]—$_n$: | | |
|---|---|---|
| Elemental Analysis: | calcd. | found |
| % C | 67.86 | 67.71 |
| % H | 9.49 | 9.52 |

GPC: $M_w$ from ca. 3,000–100,000 with the maximum at ca. 20,000. I ($M_w/M_n$)ca. 2.

Melting Point: Does not melt. Above 90° C. converts to a black, infusible, insoluble material by way of cross-linking.

Thermogravimetric Analysis (TGA): Weight loss, monitored to 1,100° C., was 18%. Monitoring the evolved gas revealed it to be initially methane and later H$_2$. Thermal decomposition is essentially complete by 800° C.

All of the synthesized silylene- and disilylenediacetylene polymers undergo cross-linking above 90° C. (without melting) to produce infusible, insoluble materials. When the polymer powders are pressed into shapes and then fired, the shapes are retained and extremely strong ceramic material is obtained.

All synthesized polymers can be cast into films from solution. When R=phenyl, fibers can be pulled from concentrated solutions.

These polymers are excellent candidates for nonlinear optical materials.

Heating these polymers up to 1,300° C. while monitoring by X-ray powder diffraction revealed only the 111,220 and 311 lines of β-silicon carbide.

EXAMPLES 2-5

The following Type A polymers were prepared using the exact procedure earlier described. R=R' equals phenyl or methyl, and mixed R's, wherein R is phenyl and R' is methyl. Each of these was characterized in the manner given above, each was formed in high yield, and had molecular weights within the range herein specified. Only those polymers which had at least one phenyl substituent on silicon pulled fibers of good quality, and these polymers also produced the best quality films.

EXAMPLES 6-7

The Type B polymer prepared had R equals methyl. Both steps performed satisfactorily and the overall reaction afforded good polymer yields.

It was also found that doping of the polymers with iodine in vacuo raised their electrical conductivities several orders of magnitude.

What is claimed is:

1. An organosilicon polymer having recurring silylene-1,3-butadiyne units of the formula:

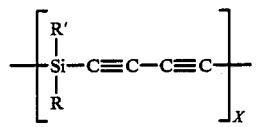

wherein X is an integer from 20 to 500 and R and R' are organic moieties or hydrogen.

2. The polymer of claim 1 wherein R and R' are selected from the group consisting of hydrogen, C$_1$ to C$_{20}$ alkyl, and C$_7$ to C$_{20}$ alkylaryl.

3. The polymer of claim 1 where R and R' are hydrogen.

4. The polymer of claim 1 wherein R and R' are C$_1$ to C$_5$ alkyl.

5. The polymer of claim 4 wherein R and R' are methyl.

6. The polymer of claim 1 wherein R is methyl and R' is phenyl.

7. The polymer of claim 1 having a molecular weight within the range of from 2,000 to about 120,000.

8. The polymer of claim 7 having a weight average molecular weight of about 20,000.

9. An organosilicon polymer having recurring disilyleneacetylene units of the formula:

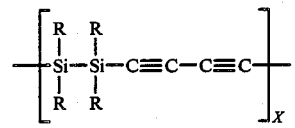

where X is an integer from 20 to 500 and R is an organic moiety or hydrogen.

10. The polymer of claim 9 wherein R is selected from the group consisting of hydrogen, C$_1$ to C$_{20}$ alkyl, and C$_7$ to C$_{20}$ alkylaryl.

11. The polymer of claim 9 wherein R is hydrogen.

12. The polymer of claim 9 wherein R is C$_1$ to C$_5$ alkyl.

13. The polymer of claim 12 wherein R is methyl.

14. The polymer of claim 9 having a molecular weight within the range of from 2,000 to about 120,000.

15. The polymer of claim 14 having a weight average molecular weight of about 20,000.

16. A method of preparing organosilicon polymers having recurring silylene-1,3-butadiyne units of the formula:

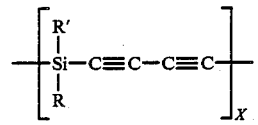

wherein R and R' are organic moieties or hydrogen and X is an integer from 20 to 500, comprising:
reacting hexachlorobutadiene with normal butyllithium to prepare dilithiobutadiyne; and
reacting said dilithiobutadiyne with a dichlorosilane of the formula: RR'SiCl$_2$, wherein R and R' are as previously defined.

17. The process of claim 16 wherein R and R' are selected from the group consisting of hydrogen C$_1$ to C$_{20}$ alkyl, C$_6$ to C$_{20}$ aryl, and C$_7$ to C$_{20}$ alkylaryl.

18. The process of claim 16 wherein the reaction is conducted in a reaction promoting organic solvent.

19. The process of claim 18 wherein said solvent is selected from the group consisting of tetrahydrofuran, diethylether, aliphatic and aromatic hydrocarbons.

20. A method of preparing organosilicon polymers having recurring disilylene-1,3-butadiyne units of the formula:

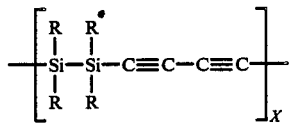

wherein R is an organic moiety or hydrogen and X is an integer from 20 to 500, comprising:

reacting hexachlorobutadiene with normal butyllithium to prepare dilithiobutadiyne; and reacting said dilithiobutadiyne with a dichlorosilane of the formula: $ClR_2SiSiR_2Cl$, wherein R is as previously defined.

21. The process of claim 20 wherein R is selected from the group consisting of hydrogen $C_1$ to $C_{20}$ alkyl, $C_6$ to $C_{20}$ aryl, and $C_7$ to $C_{20}$ alkylaryl.

22. The process of claim 21 wherein the reaction is conducted in a reaction promoting organic solvent.

23. The process of claim 22 wherein said solvent is selected from the group consisting of tetrahydrofuran, diethylether, aliphatic and aromatic hydrocarbons.

* * * * *